United States Patent
Smith et al.

(10) Patent No.: US 12,443,155 B2
(45) Date of Patent: Oct. 14, 2025

(54) APPARATUSES AND METHODS FOR ACTUALIZING FUTURE PROCESS OUTPUTS USING ARTIFICIAL INTELLIGENCE

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 248 days.

(21) Appl. No.: 18/142,536

(22) Filed: May 2, 2023

(65) Prior Publication Data
US 2024/0369979 A1    Nov. 7, 2024

(51) Int. Cl.
| G05B 13/04 | (2006.01) |
| G06N 3/08  | (2023.01) |
| G06N 3/09  | (2023.01) |
| G06N 20/00 | (2019.01) |

(52) U.S. Cl.
CPC ............. *G05B 13/042* (2013.01); *G06N 3/08* (2013.01); *G06N 3/09* (2023.01); *G06N 20/00* (2019.01)

(58) Field of Classification Search
CPC .............. G06N 20/00; G06Q 10/0637; G06Q 10/06375
See application file for complete search history.

(56) References Cited

U.S. PATENT DOCUMENTS

| 10,679,130 | B2  |  6/2020 | Pinel     |              |
|------------|-----|---------|-----------|--------------|
| 2014/0059055 | A1* | 2/2014 | Nag     | G06F 16/24   |
|            |     |         |           | 707/748      |
| 2016/0140474 | A1 |  5/2016 | Vekker   |              |
| 2018/0361203 | A1* | 12/2018 | Wang    | G16H 20/30   |
| 2019/0236106 | A1* | 8/2019 | Zhang    | G06N 20/00   |
| 2020/0005667 | A1* | 1/2020 | Baker    | G09B 19/00   |
| 2021/0056479 | A1 |  2/2021 | Olsen    |              |
| 2021/0295270 | A1* | 9/2021 | Liu      | G06F 16/9024 |
| 2021/0397613 | A1* | 12/2021 | Swint   | G06N 3/084   |
| 2022/0100867 | A1* | 3/2022 | Sinn     | G06N 3/082   |
| 2022/0405687 | A1 | 12/2022 | Matsuoka |              |

(Continued)

OTHER PUBLICATIONS

'Elements of artificial Neural Networks': Mehrotra, MIT press (Year: 1997).*

*Primary Examiner* — Schyler S Sanks
(74) *Attorney, Agent, or Firm* — Caldwell Intellectual Property Law

(57) ABSTRACT

An apparatus and method for actualizing future process outputs using artificial intelligence are provided. The apparatus includes at least a processor and a memory communicatively coupled to the at least a processor. The memory contains instructions configuring the at least a processor to receive input data associated with a user, identify at least one future process output as a function of the input data and classify the input data into one or more objective groups as a function of an objective group classifier and the at least one future process output. The processor is further configured to determine at least an actualization item as a function of the one or more objective groups and the future process output, determine at least a process parameter as a function of the future process output, and generate an objective report as a function of the success rate.

16 Claims, 7 Drawing Sheets

(56) References Cited

U.S. PATENT DOCUMENTS

2023/0032011 A1* 2/2023 Miura .................... G06Q 10/04
2023/0177115 A1* 6/2023 Tommasi ............ G06F 18/2113
                                                           706/15

* cited by examiner

APPARATUSES AND METHODS FOR ACTUALIZING FUTURE PROCESS OUTPUTS USING ARTIFICIAL INTELLIGENCE

FIELD OF THE INVENTION

The present invention generally relates to the field of artificial intelligence. In particular, the present invention is directed to apparatuses and methods for actualizing future process outputs using artificial intelligence.

BACKGROUND

Identifying future process outputs becomes increasingly complex as the number of variables increase and these complexities make it difficult for current systems to efficiently operate and make these identification. As such, modern solutions are insufficient and can be improved.

SUMMARY OF THE DISCLOSURE

In an aspect, an apparatus for actualizing future process outputs using artificial intelligence is provided. The apparatus includes at least a processor and a memory communicatively coupled to the at least a processor. The memory contains instructions configuring the at least a processor to receive input data associated with a user, identify at least one future process output as a function of the input data and classify the input data into one or more objective groups as a function of an objective group classifier and the at least one future process output. The processor is further configured to determine at least an actualization item as a function of the one or more objective groups and the future process output, determine at least a process parameter as a function of the future process output, and generate an objective report as a function of the success rate.

In another aspect, a method for actualizing future process outputs using artificial intelligence, the method comprises receiving, by at least a processor, input data associated with a user, identifying, by the at least a processor, at least one future process output as a function of the input data, classifying, by the at least a processor, the input data into one or more objective groups as a function of an objective group classifier and the at least one future process output, and determining, by the at least a processor, at least an actualization item as a function of the one or more objective groups and the future process output. The method further comprises determining, by the at least a processor, at least a process parameter as a function of the future process output, and generating, by the at least a processor, an objective report as a function of the success rate.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods and apparatuses for actualizing future process outputs using artificial intelligence. A further aspect of the present disclosure provides a tailored, interactive graphical user interface (GUI) presented to a user. Information displayed by the apparatus in the GUI allows the decision maker to efficiently and in a structured manner review data associated with actualizing future process outputs. Aspects of the current disclosure allow for efficient and accurate identification and actualization of future process outputs. Exemplary embodiments illustrating aspects of the present disclosure are described below in the context of several specific examples.

Figure 1:
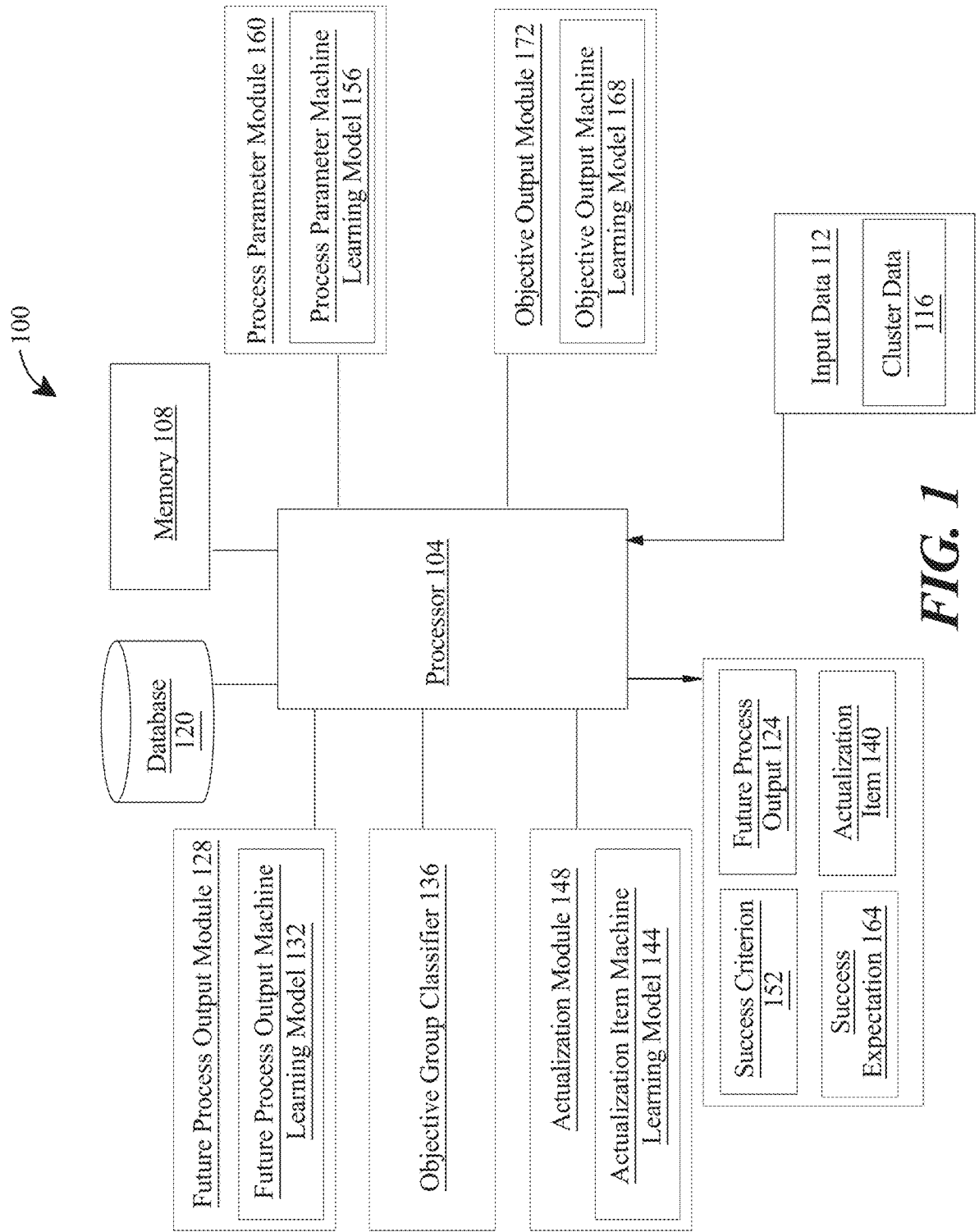
FIG. 1 is a block diagram of an apparatus for determining a risk associated with a cyber-attack.

Referring now to FIG. 1, an exemplary embodiment of an apparatus 100 for actualizing future process outputs using artificial intelligence is illustrated. Apparatus 100 includes a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Continuing to reference to FIG. 1, a computing device and/or apparatus 100 includes a memory 108 and at least a processor 104. Memory 108 may include any memory as described in this disclosure. Memory 108 is communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor/computing device as described in this disclosure.

With continued reference to FIG. 1, processor 104 may further comprise and/or be included in a server. A server may include a computing device and/or a plurality of computing devices that provide functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with processor 104 through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from processor 104 through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Still referring to FIG. 1, processor 104 is configured to receive input data 112 associated with a user. As used in this disclosure, "input data" is a collection of data and/or information about a user. Input data 112 may comprise a plurality of user related data. "User related data," as used in this disclosure, is information that includes details about and/or pertaining to a user. A "user," as used in this disclosure, is a person, business entity, and/or individual who interacts with apparatus. In an embodiment, input data and/or user related data may be obtained using a user device associated with a user. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100. In some embodiments, user related data may be in various format such as, without limitation, txt file, JSON file, word document, pdf file, excel sheet, image, video, audio, and the like. Additionally, or alternatively, user related data may be present in any data structure described in this disclosure. In an exemplary embodiment and without limitation, user related data may include any personal information related to the user. In some cases, personal information may include, without limitation, user's name, age, gender, identification, profession, experience in profession, geographical information, family information, employer, and the like. Additionally, or alternatively, user related data may also include any finance information related to the user. In exemplary embodiments, finance information may include, without limitation, assets, income, expense, debts, and the like. Additionally, or alternatively, user related data may include any health information related to the user. In exemplary embodiments, health information may include, without limitation, wellness, insurance, medical records, disease records, lifestyle, and the like thereof. In a non-limiting example, processor 104 may receive a user related in a text file format, wherein the data collection may include user's personal information such as, without limitation, user's name, age, gender, home address, and the like thereof. Additionally, or alternatively, user related data may include, without limitation, user activity data and the like. As used in this disclosure, "user activity data" is data about a user's activity and/or interaction with apparatus 100. In an exemplary embodiment, user activity data may include data about past interactions a user has had with apparatus 100, user device, and the like.

In an embodiment, input data 112 may comprise cluster data 116. As used in this disclosure, "cluster data" is input data about each user of a clustered group of users. As used in this disclosure, an "clustered group" is an organized body of people or resources. In exemplary embodiments, clustered groups may include, without limitation, a team of users, an organization of users, a group of users, and the like thereof. Further, clustered groups may be a company, business, a division of an company/organization, and the like. In an exemplary embodiment, cluster data 116 may include any input data discussed herein for each user associated with a clustered group of users. Additionally, or alternatively, cluster data 116 may also include user role data. As used in this disclosure, "user role data" is data about a current role and/or position user may hold within the clustered group. For example, user role data may indicate a first user is associated with a first position within the clustered group and a second user is associated with a second position within the clustered group.

Continuing to reference FIG. 1, receiving the input data 112 may comprise receiving a user input that comprises the input data 112. As used in this disclosure, a "user input," as used in this disclosure, is a form of data entry received from an individual and/or group of individuals, such as an individual and/or group of individuals that is using and/or interacting with apparatus 100. In an embodiment, the user input may be received from one or more of user and/or clustered group. For example, user input may be received from a user associated with a clustered group, an individual, and the like. In some cases, user input may include selecting a selection from plurality of selections as an answer. In other cases, user input may include a free user input as an answer to a user prompt. In an exemplary embodiment, input data may be in various formats such as, without limitation, txt file, JSON file, word document, pdf file, excel sheet, image, video, audio, and the like. The input data 112, user related data 116, and/or cluster data may be stored in database 120 that is communicatively connected to processor 104.

Still referring to FIG. 1, database 120 may be implemented, without limitation, as a relational database, a key-value retrieval database such as a NOSQL database, or any other format or structure for use as a database that a person skilled in the art would recognize as suitable upon review of the entirety of this disclosure. Database 120 may alternatively or additionally be implemented using a distributed data storage protocol and/or data structure, such as a distributed hash table or the like. Database 120 may include a plurality of data entries and/or records as described above. Data entries in a database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With further reference to FIG. 1, processor 104 is configured to identify at least one future process output 124 based on the input data. Additionally, or alternatively, processor 104 may be configured to identify the at least one future process output 124 based on any of user related data, cluster data, and the like. As used in this disclosure, "future process output" is a desired result resulting from efforts by the user, clustered group, and the like. For example, future process output 124 may include hosting a networking event, creating a new opportunity, signing a new client, and the like. Additionally, processor 104 may be configured to use the input data 112, user related data, and/or cluster data to identify the at least one future process output 124. Additionally, or alternatively, processor 104 may be configured to identify a plurality of future process outputs based on any of the input data 112, user related data, and/or cluster data. For example, input data and/or user related data may indicate that it may be beneficial for user to increase user visibility within a field for the user. Alternatively, or additionally, a fuzzy inferencing system for identification of the at least one future process output 124 may be employed, where any or all future process outputs may be represented as values and/or fuzzy sets for linguistic variables measuring the same. An inferencing system may use one or more fuzzy inferencing rules, as described below in FIG. 6, to output one or more linguistic variable values and/or defuzzified values indicating the at least one future process output 124. Further, Additionally, or alternatively, processor 104 may be configured to receive a user input comprising the at least one future process output 124. User input may be consistent with any user input described herein.

Continuing to reference FIG. 1, processor 104 may use a machine learning module, such as future process output module 128, to implement one or more algorithms or generate one or more machine-learning models, such as future process output machine learning model 132, to identify the at least one future process output 124. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Future process output module 128 may be used to generate future process output machine learning model 132 and/or any other machine learning model using training data. Future process output machine learning model 132 may be trained by correlated inputs and outputs of training data. Training data may be data sets that have already been converted from raw data whether manually, by machine, or any other method. Training data may include previous outputs such that future process output machine learning model 132 iteratively produces outputs. Future process output machine learning model 132 using a machine-learning process may output converted databased on input of training data. In an embodiment, identifying at least one future process output based on the input data may include determining the at least one future process output based on the input data using a machine learning model, such as future process output machine learning model 132 generated by future process output module 128. Future process output machine learning model 132 may be trained by training data, discussed in further detail below, such as future process output training data. Future process output training data may be stored in database 120.

With continued reference to FIG. 1, determining at least one future process output based on the input data may include generating a future process output machine learning model 132 and receiving future process output training data. In an embodiment, future process output training data may include a plurality of input data 112 that are each correlated to one of a plurality of future process output data. For example, future process output training data may be used to show input data and/or user related data may indicate a particular future process output. In an exemplary embodiment, a future process output may be increasing visibility of user, creating a new opportunity, and the like. In a further embodiment, future process output training data may also include a plurality of user related data that are each correlated to one of a plurality of future process output data. In such an embodiment, future process output training data may be used to show how user related data May indicate a particular future process output. Additionally, or alternatively, identifying the at least one future process output based on the input data may further include training the future process output machine learning model 132 as a function of future process output training data. Further, determining at least one user specific objective based on the input data may also include determining at least one future process output using trained future process output machine learning model 132.

With further reference to FIG. 1, processor 104 may be configured to determine a highest priority future process output of the at least one future process output. Additionally, or alternatively, processor 104 may be configured to determine the highest priority future process output based on the input data. For example, input data may comprise at least one user constraint. As used in this disclosure, "user constraint' is a limiting property that affects the at least a future process output. For example, the at least one user constraint may be a budget for user, a time constraint to complete the future process output, and the like. In some embodiments, processor 104 may be configured to solve at least an optimization problem, which may be an objective function, to determine the highest priority future process output. An "objective function," as used in this disclosure, is a mathematical function with a solution set including a plurality of data elements to be compared. Processor 104 may compute a score, metric, ranking, or the like, associated with future process output and select objectives to minimize and/or maximize the score/rank, depending on whether an optimal result is represented, respectively, by a minimal and/or maximal score; an objective function may be used by processor 104 to score each future process output. At least an optimization problem may be based on one or more objectives, as described below. Processor 104 may determine a future process output that optimizes the objective function based on the at least one user constraint. In various embodiments solving at least an optimization problem may be based on a combination of one or more factors. Each factor may be assigned a score based on predetermined variables. In some embodiments, the assigned scores may be weighted or unweighted.

With continued reference to FIG. 1, solving at least an optimization problem may include performing a greedy algorithm process, where optimization is performed by minimizing and/or maximizing an output of objective function. A "greedy algorithm" is defined as an algorithm that selects locally optimal choices, which may or may not generate a globally optimal solution. For instance, processor 104 may select objectives so that scores associated therewith are the best score for each goal. For instance, in non-limiting illustrative example, optimization may determine the future process output based on an the at least one user constraint.

Still referring to FIG. 1, the optimization problem may be formulated as a linear objective function, which processor 104 may optimize using a linear program such as without limitation a mixed-integer program. A "linear program," as used in this disclosure, is a program that optimizes a linear objective function, given at least a constraint; a linear program may be referred to without limitation as a "linear optimization" process and/or algorithm. For instance, in non-limiting illustrative examples, a given constraint might be a time constraint associated completing the at least one future process output, and a linear program may use a linear objective function to calculate the at least one future process output based on the limit. In various embodiments, processor 104 may determine a set of future process outputs for the user subject to a constraint. A mathematical solver may be implemented to solve for the set of instructions that maximizes scores; mathematical solver may be implemented on processor 104. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression of an output of which a ranking process minimizes to generate an optimal result. As a non-limiting example, processor 104 may assign variables relating to a set of parameters, which may correspond to the at least one user constraint as described above, calculate an output of mathematical expression using the variables, and select an objective that produces an output that maximizes effects of the at least one future process output. Selection of different loss functions may result in identification of different potential future process outputs as maximizing impact on the user.

Still referring to FIG. 1, the optimization problem may include, but is not limited to, continuous optimization, bound constrained optimization, constrained optimization, derivative-free optimization, discrete optimization, global optimization, and/or nondifferentiable optimization. The optimization function may include minimizing a loss function, where a "loss function" is an expression of an output of which an optimization algorithm minimizes to generate an optimal result. As a non-limiting example, processor 104 may assign variables relating to a set of parameters, which may correspond to at least one user constraint as described above, calculate an output of mathematical expression using the variables, and select an objective that produces an output that maximizes benefits to the user. Selection of different loss functions may result in identification of different potential pairings as generating minimal outputs. The optimization problem may include a plurality of parameters. The plurality of parameters may include, but is not limited to, any of the at least one user constraints as described above. In some embodiments, the optimization problem may maximize one or more parameters. In some embodiments, the optimization problem may minimize one or more parameters. In some embodiments, the optimization problem may include one or more constraints that may be placed on one or more parameters. In a non-limiting example, a constraint may be placed on a budget for the at least one future process output. In another non-limiting example, a constraint may be placed on a time available for completion of the at least one future process output. In some embodiments, the optimization problem may minimize resources necessary (e.g. time and money) and/or other parameters. In other embodiments, the optimization problem may maximize parameters such as, but not limited to, benefits to the user.

With continued reference to FIG. 1, the optimization problem may predict at least one future process output with the highest priority based on minimization of resource consumption. In a non-limiting example, the optimization problem may predict at least one future process output that needs urgent attention. In such an example, other parameters may be at non-optimal values that may allow for the future process output to be addressed immediately. In such an example, the other parameters may be optimized second to the minimization of resource consumption. In some embodiments, one or more parameters may be weighted. The weight of the parameters may include an emphasis on certain parameters, such as, but not limited to, resources consumption and/or time constraints. In other embodiments, other parameters may be weighted which may allow said parameters to more heavily influence the optimization problem and the recommended remediation action.

With further reference to FIG. 1, processor 104 may be configured to generate a ranked list of the at least one future process output 124. For example, processor 104 may generate an ordered list ranking each of the at least one future process output in order based on a benefit to user. Such a list may indicate a first future process output having the most relevance and/or effect on the user than a second future process output, and the like. In an exemplary embodiment, processor 104 may generate an ordered list ranking signing a new client, creating a new opportunity, and hosting a networking event in order. Such a list may indicate signing a new client having the most relevance and/or effect on user, creating a new opportunity having less relevance and/or effect than signing a new client but more relevance and/or effect than hosting a networking event.

With continued reference to FIG. 1, the ranked list of the at least one future process output 124 may be determined, as a non-limiting example, using a machine learning model. In an embodiment, the machine learning model may receive training data correlating a plurality of future process output data to an effect of the future process output data on the input data. In a further embodiment, input data may be classified to categories or cohorts of input data, for which relative importance of future process outputs may be stored and/or determined using further machine-learning methods, which can be used to determine the ranked list of the at least one future process output 124. For example, input data 112 may be associated and/or classified into a category for users with similar input data. In a further exemplary embodiment, the user may be associated and/or classified with other users in the same field of operation, for example entrepreneur consulting companies, and the like. The database 120 may also store data about the relative importance of each of future process outputs for each of these categories and/or fields of operation. Additionally or alternatively, a machine learning model may be used to determine the relative importance of each future process outputs for each of these categories and/or fields of operation.

Still referencing FIG. 1, processor 104 is configured to classify the at least one future process output into one or more objective groups as a function of an objective group classifier 136. For example, processor 104 may be configured to classify the at least one future process output into objective groups such as personal objective, pecuniary objective, clustered group objective, and the like using the objective group classifier 136. As used in this disclosure, "personal objective" is a desired result directed towards personal advancement of an individual user. "Pecuniary objective," as used in this disclosure is a desired result relating fiscal advancement. Further, as used in this disclosure, "clustered group objective" is a desired result directed towards advancement of a clustered group. One skilled in the art will recognize various other types of objective groups that may exist. Objective group classifier 136 may classify distinct routine to one or more types and/or category of future process outputs, which may include any type of future process output category, sub-categories and/or more specific categories, or the like. For instance, objective group classifier 136 may receive future process output data and classify the future process output data according to type of future process output such as personal objective, pecuniary objective, clustered group objective, or the like. Objective group classifier 136 may be trained using training data correlating future process output data to a type of future process output.

Objective group classifier 136 may be any classifier described herein. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as objective classification training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With further reference to FIG. 1, processor 104 is configured to determine at least an actualization item 140 as a function of the one or more objective groups and the at least one future process output. As used in this disclosure, an "actualization item" is an output of an action item to be performed by user to obtain the at least one future process output. In an exemplary embodiment, at least one actualization item 140 may include updating user details on an online platform, updating an introductory letter, setting a time to search for open positions, submitting inquiries to open positions, and the like. The at least one actualization item 140 may be generated based on input data 112, user related data, cluster data 116, the at least one future process output 124, one or more objective groups, and the like. Additionally, or alternatively, in an embodiment, processor 104 may be configured to determine a plurality of actualization items 140. In an embodiment, when processor 104 determines a plurality of actualization items 140, processor 104 may be configured to aggregate each of the plurality of actualization items 140 and generate an actualization series as a function of the aggregating each of the plurality of actualization items 140. As used in this disclosure, "actualization series" is a list of a plurality of action items to be performed by user to obtain the at least one future process output.

With continued reference to FIG. 1, processor 104 may be configured to determine the at least an actualization item 140 using a machine learning model, such as actualization item machine learning model 144 generated by actualization module 148. In an embodiment, actualization module 148 may be any machine learning module as discussed herein. Actualization item machine learning model 144 may be trained by training data, discussed in further detail below, such as actualization item training data. Actualization item training data may be stored in a database such as database 120.

With continued reference to FIG. 1, determining the at least an actualization item as a function of the one or more objective groups and the at least one future process output may include generating an actualization item machine learning model 144 and receiving actualization item training data. In an embodiment, actualization item training data may include a plurality of future process output data that are each correlated to at least one of a plurality of actualization item data. For example, actualization item training data may be used to show future process output data may indicate a particular actualization item. In an exemplary embodiment, an actualization item may be updating user details on an online platform, update an introductory letter, set a time to search for open positions, submit inquiries to open positions, and the like. In a further embodiment, actualization item training data may also include a plurality of objective group data that are each correlated to at least one of a plurality of actualization item data. In such an embodiment, actualization item training data may be used show how objective group data may indicate at least one particular actualization item. In a further embodiment, actualization item training data may also include a plurality of objective group data and future process output data that are each correlated to one of a plurality of actualization item data. In such an embodiment, actualization item training data may be used to show how the future process output data and the objective group data may indicate at least one particular actualization item. Determining the at least an actualization item as a function of the one or more objective groups and the at least one future process output may further include training the actualization item machine learning model 144 as a function of actualization item training data. Further, determining the at least an actualization item as a function of the one or more objective groups and the at least one future process output may also include generating the at least an actualization item 140 using the trained actualization item machine learning model 144.

With further reference to FIG. 1, additionally, or alternatively, determining the at least an actualization item as a function of the one or more objective groups and the at least one future process output may comprise calculating an actualization item score for each of the at least an actualization item. As used in this disclosure, "actualization item score" is score indicating of a relative importance of each actualization item 140 for the completion of the at least a future process output 124. In an embodiment, the actualization item score may include a ranking out of five stars, out of a scale of 1-10, a percentage score, and the like. For example, a first actualization item with an actualization item score of "23" may be an indication the first actualization item has an decreased importance to the at least one future process output 124 than a second actualization item with an actualization item score of "88". Alternatively, or additionally, the actualization item score may be an alphabetic score, such as, but not limited to, "A+", "A", "A−", "B+", "B", "B−", "C+", "C", "C−", "D+", "D", "D−", "F", and the like. In such an embodiment, a first actualization item with an actualization item score of "B" may be an indication the first actualization item has an increased importance to the at least one future process output 124 than a second actualization item with an actualization item score of "C+".

With continued reference to FIG. 1, in an embodiment, the actualization item score may be calculated as a function of the at least an actualization item and the at least one future process output using a machine learning model, discussed in further detail below and in FIG. 4, such as actualization item score machine learning model generated by a machine learning module. The actualization item score machine learning model may be trained by training data, discussed in further detail in FIG. 4, such as actualization item score training data. Actualization item score training data may be stored in database 120.

With further reference to FIG. 1, calculating the actualization item score for each of the at least an actualization item may include receiving actualization item score training data. In an embodiment, the actualization item score training data may include a plurality of actualization item data and future process output data pairs that are each correlated to one of a plurality of actualization item score data. For example, actualization item score data may be calculated using historical data quantifying a relationship between actualization items and future process outputs to an actualization item score. Further, calculating the actualization item score for each of the at least an actualization item may further include training an actualization item score machine learning model as a function of the risk score training data. Additionally, calculating the actualization item score for each of the at least an actualization item may further include calculating the actualization item score using the trained actualization item score machine learning model. Alternatively, or additionally, a fuzzy inferencing system for determination of actualization item score may be employed, where any or all digital environment risk scores may be represented as values and/or fuzzy sets for linguistic variables measuring the same. An inferencing system may use one or more fuzzy inferencing rules, as described below in FIG. 6, to output one or more linguistic variable values and/or defuzzified values indicating the actualization item score.

Still referencing FIG. 1, determining the at least an actualization item as a function of the one or more objective groups and the at least one future process output may comprise comparing each actualization item score to a threshold actualization item score. As used in this disclosure, "threshold actualization item score" is a minimum measure of importance of an actualization item 140 to the at least one future process output 124 to identify an actualization item as one of the at least an actualization item. Further, determining the at least an actualization item as a function of the one or more objective groups and the at least one future process output may comprise identifying the at least an actualization item based on the comparison of each a actualization item score to the threshold actualization item score. For example, when an actualization item score for an actualization item is greater than the threshold actualization item score, processor 104 may be configured to identify the actualization item as one of the at least an actualization item 140. In an embodiment, the threshold actualization item score may be calculated by a machine-learning and/or statistical process, for instance and without limitation as described herein.

With further reference to FIG. 1, processor 104 may be configured to generate a ranked list of the at least an actualization item 140. For example, processor 104 may generate an ordered list ranking each of the at least an actualization item 140 in order based on the actualization item score. Such a list may indicate a first actualization item having the most relevance and/or effect on the future process output than a second actualization item, and the like. In an exemplary embodiment, processor 104 may generate an ordered list ranking set a time to search for open positions, update an introductory letter, and submit inquiries to open positions in order. Such a list may indicate setting a time to search for open positions having the most relevance and/or effect on future process output, update an introductory letter having less relevance and/or effect than setting a time to search for open positions but more relevance and/or effect than submitting inquiries to open positions.

With further reference to FIG. 1, processor 104 is configured to determine at least one process parameter 152 as a function of the at least one future process output. As used in this disclosure, an "process parameter" is an output of an indicator item associated with success of the at least one future process output. In an exemplary embodiment, at least one process parameter 152 may include generating a threshold level of new work, receiving a new job offer letter, and the like. The at least one process parameter 152 may be generated based on the at least one future process output 124, one or more objective groups, and the like. Additionally, or alternatively, in an embodiment, processor 104 may be configured to determine a plurality of process parameter 152. For example, when processor 104 determines a plurality of process parameter 152, processor 104 may be configured to aggregate each of the plurality of process parameter 152 and generate a criterion series as a function of the aggregating each of the plurality of process parameter 152. As used in this disclosure, "criterion series" is a list of a plurality indicator items associated with success of the at least one future process output.

With continued reference to FIG. 1, processor 104 may be configured to determine the at least one process parameter 152 using a machine learning model, such as criterion machine learning model 156 generated by criterion module 160. In an embodiment, criterion module 160 may be any machine learning module as discussed herein. Criterion machine learning model 156 may be trained by training data, discussed in further detail below, such as criterion training data. Criterion training data may be stored in a database such as database 120.

With continued reference to FIG. 1, determining the at least a process parameter as a function of the at least one future process output may include generating a criterion machine learning model 156 and receiving criterion training data. In an embodiment, criterion training data may include a plurality of future process output data that are each correlated to at least one of a plurality of process parameter data. For example, criterion training data may be used to show future process output data may indicate a particular process parameter. In an exemplary embodiment, a process parameter may be generating a threshold level of new work, receiving a new job offer letter, and the like. In a further embodiment, criterion training data may also include a plurality of objective group data that are each correlated to at least one of a plurality of process parameter data. In such an embodiment, criterion training data may be used to show how objective group data may indicate at least one particular process parameter. Determining the at least a process parameter as a function of the at least one future process output may include may further include training the criterion machine learning model 156 as a function of criterion training data. Further, determining the at least a process parameter as a function of the at least one future process output may also include generating the at least a process parameter 152 using the trained criterion machine learning model 156.

With further reference to FIG. 1, processor 104 may be configured to determine a success expectation for the at least one future process output. As used in this disclosure, an "success expectation" is an indicator of likelihood of success of the at least one future process output. In an exemplary embodiment, success expectation may include a ranking out of five stars, out of a scale of 1-10, a percentage score, and the like. For example, success expectation may be a 4 star ranking, an 8/10 ranking, an 80% ranking, and the like. Alternatively, or additionally, the actualization item score may be an alphabetic score, such as, but not limited to, "A+", "A", "A−", "B+", "B", "B−", "C+", "C", "C−", "D+", "D", "D−", "F", and the like. In such an embodiment, success expectation may be a "B−" ranking. Additionally, or alternatively, processor is configured to determine the success expectation for the at least one future process output as a function of the input data. In an exemplary embodiment, processor 104 may be configured to use any of input data 112 to determine success expectation. Further, as an example, input data 112 may include user activity data, as described above, which may indicate user has engaged in similar activities to the at least one future process output in the past. Accordingly, processor 104 may be configured to determine an increased success expectation based on the user's past similar experiences.

With continued reference to FIG. 1, processor 104 may be configured to determine the success expectation using a machine learning model, such as success machine learning model generated by success module. In an embodiment, success module may be any machine learning module as discussed herein. Success machine learning model 168 may be trained by training data, discussed in further detail below, such as success training data. Success training data may be stored in a database such as database 120.

With continued reference to FIG. 1, determining the success expectation as a function of the at least one future process output may include generating a success machine learning model and receiving success training data. In an embodiment, success training data may include a plurality of input data and future process output data pairs that are each correlated to one of a plurality of success expectation data. For example, actualization item score data may be calculated using data quantifying a relationship between input data and future process outputs to a success expectation. Determining the success expectation for the at least one future process output as a function of the input data may include may further include training the success machine learning model as a function of success training data. Further, determining the success expectation for the at least one future process output as a function of the input data may also include generating the success expectation using the trained success machine learning model.

With further reference to FIG. 1, processor 104 is configured to generate an objective output 164 as a function of the process parameter. As used in this disclosure, an "objective output" is data structure representing an overview of the future process output 124, the at least an actualization item 140, the at least one process parameter 152, and the success expectation that may be used for decision-making associated with implementation of a future process output for the user; objective output may include an initial display of data having less information than any of future process output 124, the at least an actualization item 140, the at least one process parameter 152, and the success expectation 164.

With continued reference to FIG. 1, processor 104 may be configured to generate an objective output 164 as a function of the process parameter using a machine learning model, such as objective output machine learning model 168 generated by objective output module 172. In an embodiment, objective output module 172 may be any machine learning module as discussed herein. Objective output machine learning model 168 may be trained by training data, discussed in further detail below, such as success training data. Objective output training data may be stored in a database such as database 120.

With continued reference to FIG. 1, generate an objective output as a function of the process parameter may include generating an objective output machine learning model 168 and receiving objective output training data. In an embodiment, objective output training data may include a plurality of process parameter data each correlated to one of a plurality of objective output data. For example, objective output may be generated using data correlating any of future process output 124, the at least an actualization item 140, the at least one process parameter 152, and the success expectation 164 to the objective output 164. Generating the objective output as a function of the process parameter may further include training the objective output machine learning model 168 as a function of objective output training data. Further, generating the objective output as a function of the process parameter may also include generating the objective output 164 using the trained objective output machine learning model 168.

With continued reference to FIG. 1, processor 104 may be configured to generate a user interface data structure configured to display and including any combination of the at least one future process output 124, the at least an actualization item 140, the at least one process parameter 152, and the success expectation 164. User interface data structure may allow at least one future process output 124, the at least an actualization item 140, the at least one process parameter 152, and the success expectation 164 to be displayed on a display, graphical user interface, and the like. The at least one future process output 124, the at least an actualization item 140, the at least one process parameter 152, and the success expectation 164 may be reviewed by a user, cluster manager, and any other decision makers for entity to gather information quickly and efficiently about the at least one future process output 124, the at least an actualization item 140, the at least one process parameter 152, and the success expectation 164 and determine whether the at least one future process output should be modified. Additionally, a layered structure at least one future process output 124, the at least an actualization item 140, the at least one process parameter 152, and the success expectation 164 may provide additional information associated with each of the at least one future process output 124, the at least an actualization item 140, the at least one process parameter 152, and the success expectation 164.

Continuing to refer to FIG. 1, processor 104 is communicatively connected to a graphical user interface (GUI) configured to display any information from apparatus 100 and/or any computing device. GUI may be configured to be displayed on, without limitation, a display; the display may include any display as described in the entirety of this disclosure such as a light emitting diode (LED) screen, liquid crystal display (LCD), organic LED, cathode ray tube (CRT), touch screen, or any combination thereof.

With further reference to FIG. 1, GUI may be configured to receive user interface data structure 164 for any combination of at least one future process output 124, the at least an actualization item 140, the at least one process parameter 152, and the success expectation 164, and the like. Additionally, or alternatively, GUI may be configured to display at least one future process output 124, the at least an actualization item 140, the at least one process parameter 152, and the success expectation 164 on a respective portion of GUI for review by a user, cluster manager, and any other decision makers for user to gather information quickly and efficiently about the at least one future process output 124, the at least an actualization item 140, the at least one process parameter 152, and the success expectation 164 and determine whether the at least one future process output should be modified. For example, at least one future process output 124 may be displayed on a first portion of GUI, the at least an actualization item 140 may be displayed on a second portion of GUI, the at least one process parameter 152 may be displayed on a third portion of GUI, and the success expectation 164 may be displayed on a fourth portion of GUI.

Continuing to reference FIG. 1, GUI may be configured to receive a user input. In an embodiment, GUI may be configured to receive a user input that selects (e.g., click on, interacts with, and the like) any portion of GUI. For example, portions of the GUI may be a first portion displaying the at least one future process output 124, a second portion displaying at least an actualization item 140, a third portion displaying the at least one process parameter 152, and a fourth portion displaying the success expectation 164, as described above, and any portion of GUI may be selected by the user. Additionally, GUI may be configured to display a user prompt to the user configured top receive a user response for any of the at least one future process output 124, the at least an actualization item 140, the at least one process parameter 152. Additionally, or alternatively, user response from the user may comprise a modification to any of the at least one future process output 124, the at least an actualization item 140, the at least one process parameter 152. For example, in an embodiment, user response may comprise changing the at least one future process output, adding an actualization item, deleting one of the at least one process parameter, and the like.

Figure 2:
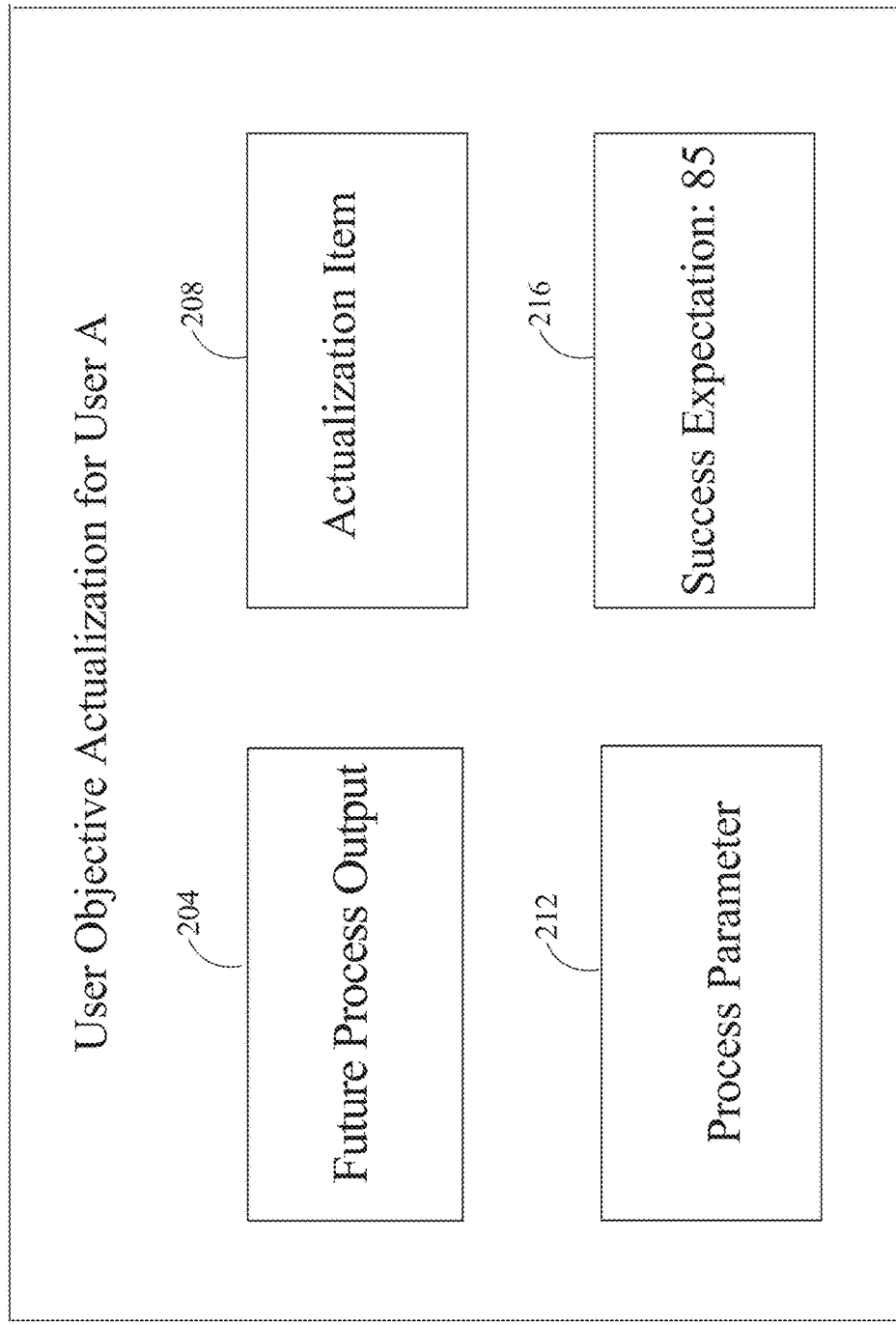
FIG. 2 is an exemplary embodiment of a graphical user interface.

Now referencing FIG. 2, an exemplary embodiment 200 of GUI is shown. As used in the current disclosure, a "graphical user interface" may include a plurality of lines, images, symbols. GUI 200 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. In the exemplary embodiment 200, the GUI may include a first portion 204, a second portion 208, a third portion 212, and a fourth portion 216 but is not limited to such an embodiment. In an exemplary embodiment, first portion 204 may be configured to display at least one future process output. Second portion 208 may be configured to display at least an actualization item. Third portion 212 may be configured to display at least one process parameter. Fourth portion 216 may be configured to display success expectation. The at least one future process output may be consistent with any future process output as discussed herein. The at least an actualization item may be consistent with any actualization item as discussed herein. The at least one process parameter may be consistent with any process parameter as discussed herein. Success expectation may be consistent with any success expectation as described herein.

Figure 3:
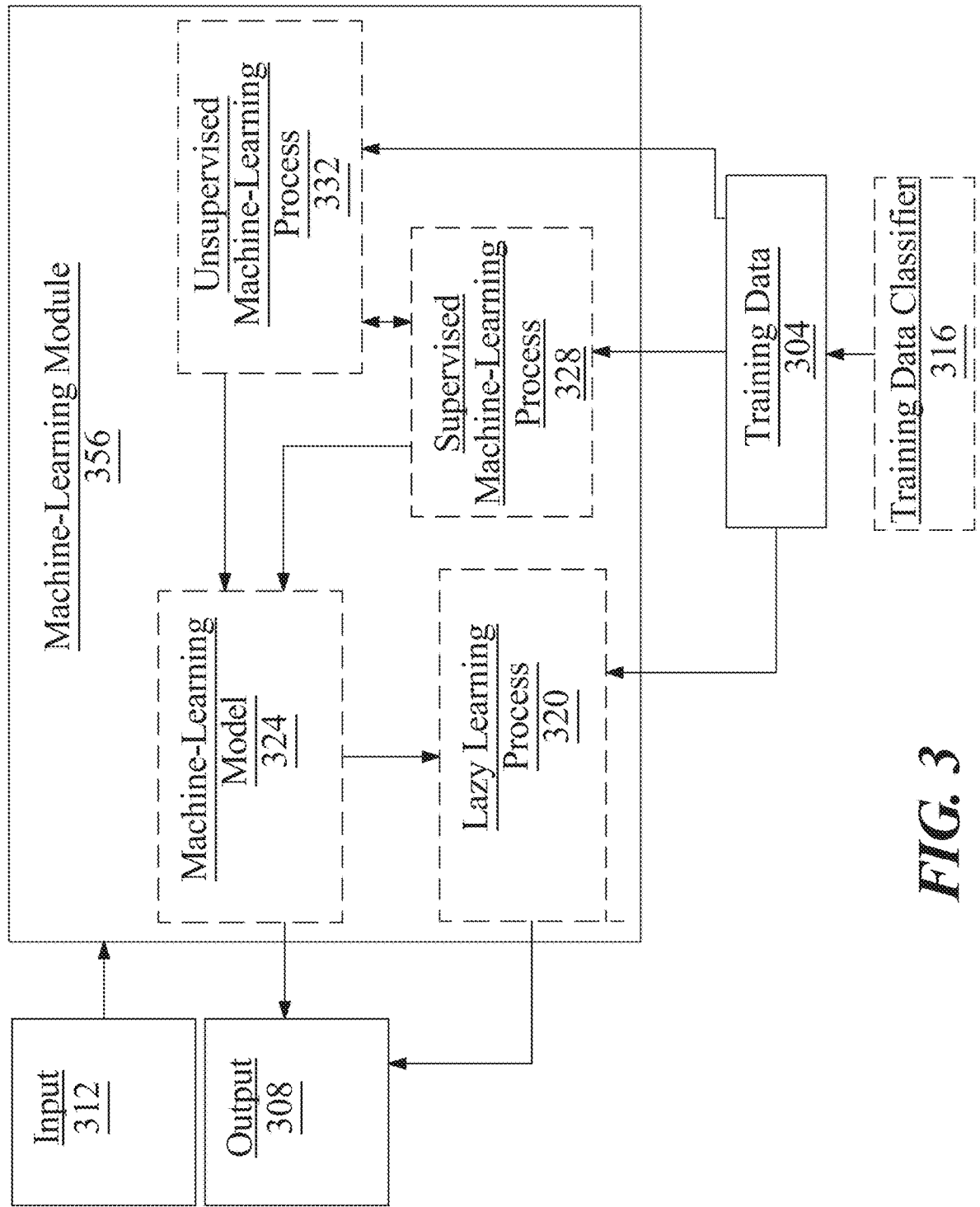
FIG. 3 is an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, a user profile may be an input and a predictive quantifier may be an output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
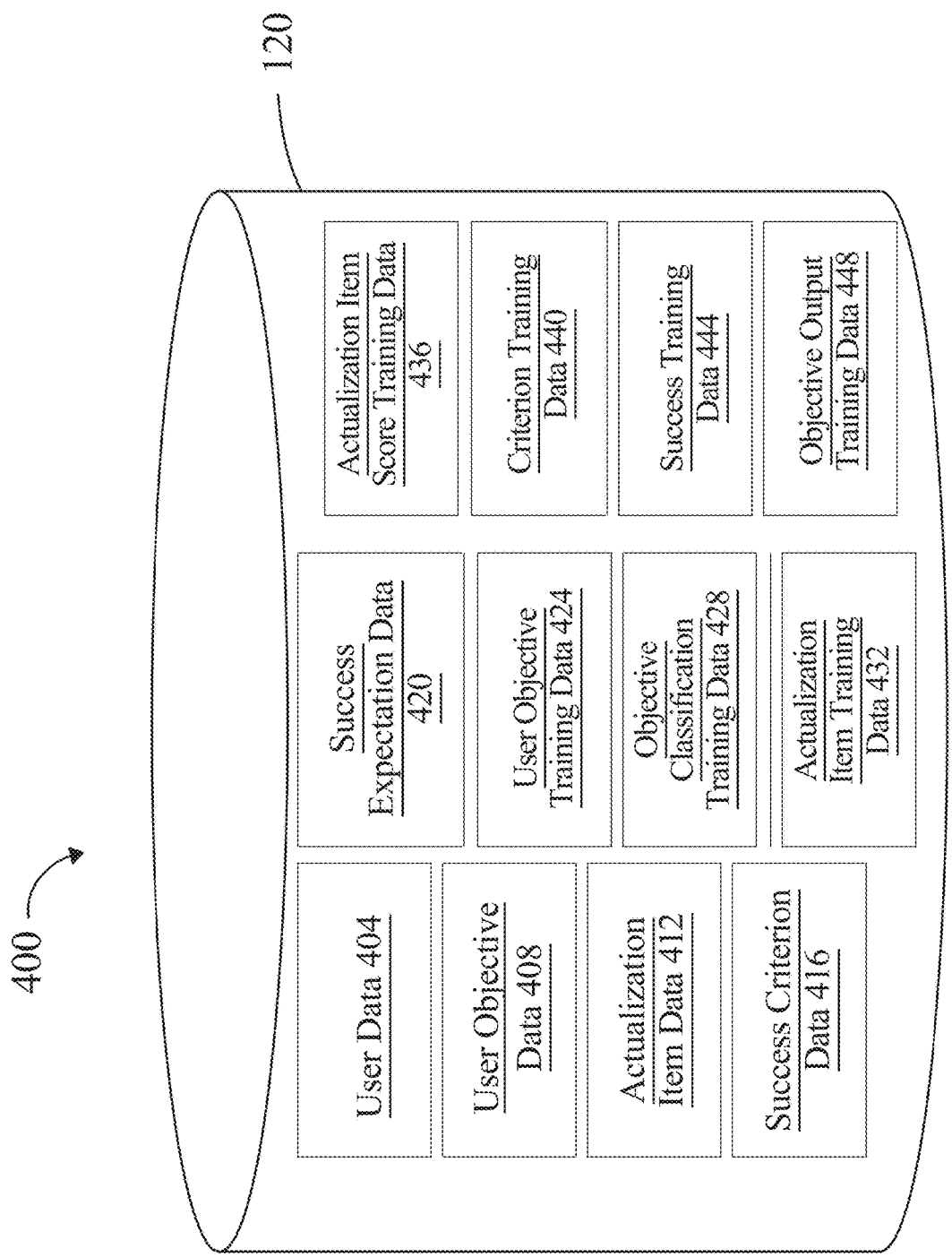
FIG. 4 is an exemplary embodiment of a database.

Now referencing FIG. 4, an exemplary embodiment 400 of database 120 is shown. Database 120 may be implemented, without limitation, as a relational database, a key-value retrieval database such as a NOSQL database, or any other format or structure for use as a database that a person skilled in the art would recognize as suitable upon review of the entirety of this disclosure. A key-value retrieval database may include any key such as voice activation. Database 120 may alternatively or additionally be implemented using a distributed data storage protocol and/or data structure, such as a distributed hash table or the like. Database 120 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 120 may be used to store input data 404, future process output data 408, actualization item data 412, process parameter data 416, success expectation data 420, future process output training data 424, objective classification training data 428, actualization item training data 432, actualization item score training data 436, criterion training data 440, success training data 444, objective output training data 448, and the like. Input data 404 may be consistent with any input data as discussed herein. Future process output data 408 may be consistent with any at least one future process output as discussed herein. Actualization item data 412 may be consistent with any at least an actualization item as discussed above. Process parameter data 416 may be consistent with any at least one process parameter as discussed herein. Success expectation data 420 may be consistent with any success expectation as discussed herein. Future process output training data 424, objective classification training data 428, actualization item training data 432, actualization item score training data 436, criterion training data 440, success training data 444, and objective output training data 448 may be consistent with any training data as discussed herein.

Figure 5:
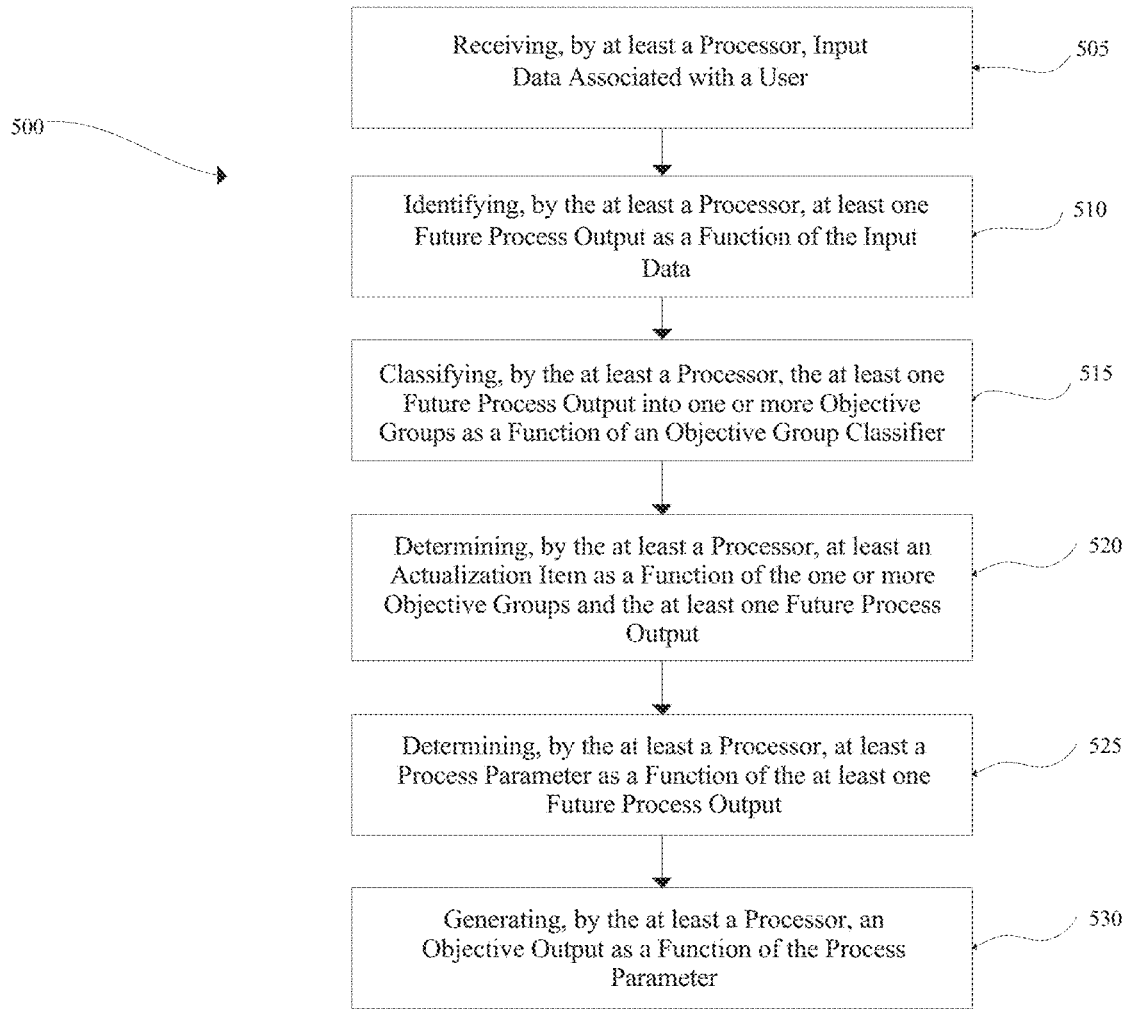
FIG. 5 is a flow diagram illustrating a method of determining a risk associated with a cyber-attack.

Referring now to FIG. 5, an exemplary embodiment of method 500 for actualizing future process outputs using artificial intelligence is shown. Step 505 of method 500 includes receiving, by at least a processor, input data associated with a user. This may be implemented, without limitation, as described above in reference to FIGS. 1-4.

Still referring to FIG. 5, step 510 of method 500 includes identifying, by the at least a processor, at least one future process output as a function of the input data. In an embodiment, identifying the at least one future process output as a function of the input data may comprise generating, by the at least a processor, a future process output machine learning model, training, by the at least a processor, the future process output machine learning model as a function of user training data, and generating, by the at least a processor, the at least one future process output using the trained future process output machine learning model. Additionally, or alternatively, identifying the at least one future process output as a function of the input data further may comprise determining a highest priority future process output of the at least one future process output. Further, identifying the at least one future process output as a function of the input data further may comprise generating a ranked list of the at least one future process output. These may be implemented, without limitation, as described above in reference to FIGS. 1-4.

With further reference to FIG. 5, step 515 of method 500 includes classifying, by the at least a processor, the at least one future process output into one or more objective groups as a function of an objective group classifier. This may be implemented, without limitation, as described above in reference to FIGS. 1-4.

With further reference to FIG. 5, step 520 of method 500 includes determining, by the at least a processor, at least an actualization item as a function of the one or more objective groups and the at least one future process output. In an embodiment, determining the at least an actualization item as a function of the one or more objective groups may comprise generating, by the at least a processor, an actualization item machine learning model, training, by the at least a processor, the actualization item machine learning model as a function of actualization item training data, and generating, by the at least a processor, the at least a actualization item using the trained actualization item machine learning model. Additionally, or alternatively, determining the at least an actualization item as a function of the one or more objective groups and the at least one future process output may comprise determining, by the at least a processor, an actualization item score for each of the at least an actualization item, comparing, by the at least a processor, each actualization item score to a threshold actualization item score, and identifying, by the at least a processor, the at least an actualization item based on the comparison of each a actualization item score to the threshold actualization item score. Further, additionally, or alternatively, determining the at least an actualization item as a function of the one or more objective groups and the at least one future process output may comprise generating a ranked list of the at least an actualization item as a function of the actualization item score. These may be implemented, without limitation, as described above in reference to FIGS. 1-4.

Continuing to reference FIG. 5, step 525 of method 500 includes determining, by the at least a processor, at least once process parameter as a function of the at least one future process output. In an embodiment, determining the at least one process parameter as a function of the future process output may comprise generating, by the at least a processor, a process parameter machine learning model, training, by the at least a processor, the process parameter machine learning model as a function of process parameter training data, and generating, by the at least a processor, the at least a process parameter using the trained process parameter machine learning model. These may be implemented, without limitation, as described above in reference to FIGS. 1-4.

Continuing to reference FIG. 5, step 530 of method 500 includes generating, by the at least a processor, an objective output as a function of the process parameter. This may be implemented, without limitation, as described above in reference to FIGS. 1-4.

Still referring to FIG. 5, method 500 may include determining, by the at least a processor, a success expectation for the at least one future process output as a function of the input data. In an embodiment, determining the success expectation for the at least one future process output as a function of the input data may comprise generating, by the at least a processor, a success expectation machine learning model, training, by the at least a processor, the success expectation machine learning model as a function of success expectation training data, and generating, by the at least a processor, the success expectation using the trained success expectation machine learning model. These may be implemented, without limitation, as described above in reference to FIGS. 1-4.

Continuing to reference FIG. 5, method 500 may include receiving, by the at least a processor, a user response from the user for the at least process parameter and the at least an actualization item. In an embodiment, the user response from the user may comprise a modification to the at least an actualization item. These may be implemented, without limitation, as described above in reference to FIGS. 1-4.

Figure 6:
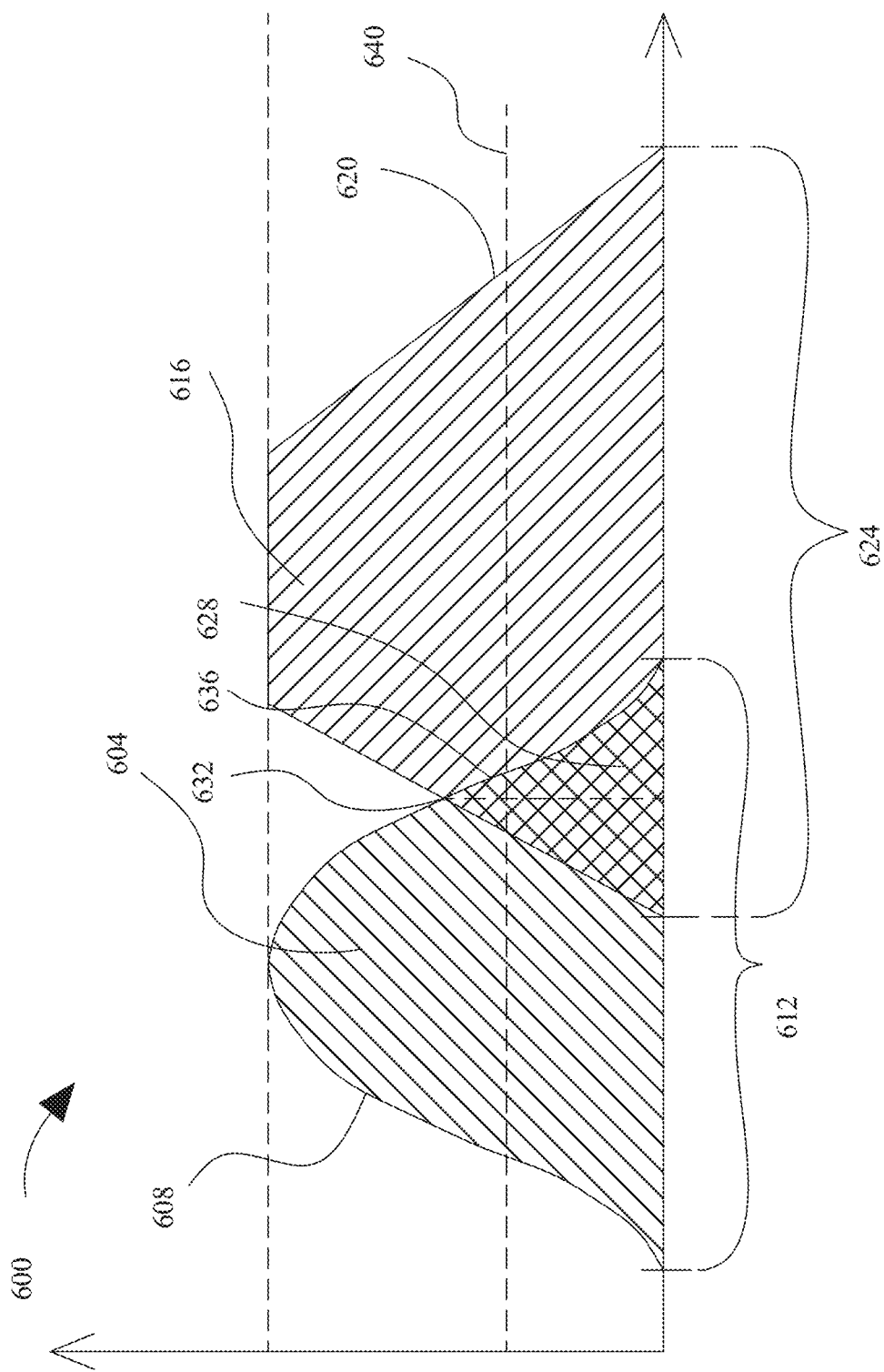
FIG. 6 is a schematic diagram illustrating an exemplary embodiment of a fuzzy inferencing system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 662 representing a probability, as defined on probability interval, of a match between first fuzzy set 604 and second fuzzy set 616. Alternatively, or additionally, a single value of first and/or second fuzzy set may be located at a locus 666 on first range 612 and/or second range 624, where a probability of membership may be taken by evaluation of first membership function 608 and/or second membership function 620 at that range point. A probability at 628 and/or 662 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to identify the at least one future process output. For example, if input data has a fuzzy set matching first future process output fuzzy set by having a degree of overlap exceeding a threshold, processor 104 may determine the first future process output as one of the at least one future process output. Where multiple fuzzy matches are performed, degrees of match for each respective fuzzy set may be computed and aggregated through, for instance, addition, averaging, or the like, to determine an overall degree of match.

Still referring to FIG. 6, in an embodiment, data about the input data may be compared to multiple future process output fuzzy sets. For instance, input data, as described above, may be represented by a fuzzy set that is compared to each of the multiple future process output fuzzy sets; and a degree of overlap exceeding a threshold between the input data fuzzy set and any of the multiple future process output fuzzy sets may cause processor 104 to identify each of the future process outputs associated with the fuzzy sets as future process outputs of the at least one future process output. For instance, in one embodiment there may be two future process output fuzzy sets, representing respectively a first future process output and a second future process output. A first future process output may have a first fuzzy set; second future process output may have a second fuzzy set; and input data may have a input data fuzzy set. Processor 104, for example, may compare the input data fuzzy set with each of first future process output fuzzy set and second future process output fuzzy set, as described above, and identify either, both, or neither of first and second future process outputs as the at least one future process output for the user. Machine-learning methods as described throughout may, in a non-limiting example, generate coefficients used in fuzzy set equations as described above, such as without limitation x, c, and σ of a Gaussian set as described above, as outputs of machine-learning methods. Likewise, user response may be used indirectly to determine a fuzzy set, as user response fuzzy set may be derived from outputs of one or more machine-learning models that take the user response directly or indirectly as inputs.

Still referring to FIG. 6, a computing device may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of future process output as calculated using any statistical, machine-learning, or other method that may occur to a person skilled in the art upon reviewing the entirety of this disclosure. In other words, a given element of input data may have a first non-zero value for membership in a first linguistic variable value such as first future process output and a second non-zero value for membership in a second linguistic variable value such as a second future process output. In some embodiments, identifying at least one future process output may include using a linear regression model. A linear regression model may include a machine learning model. A linear regression model may be configured to map entity data to one or more future process outputs. A linear regression model may be trained using training data as discussed above. In some embodiments, identifying the at least one future process output may include using a future process output classification model. A future process output classification model may be configured to input collected data and cluster data to a centroid based on, but not limited to, frequency of appearance, and the like. Centroids may include compatibility scores assigned to them such that each input data may each be assigned a compatibility score. In some embodiments, an urgency classification model may include a K-means clustering model. In some embodiments, a future process output classification model may include a particle swarm optimization model. In some embodiments, determining a compatibility score of future process output may comprise using a fuzzy inference engine. A fuzzy inference engine may be configured to map one or more data elements using fuzzy logic. In some embodiments, a plurality of future process outputs may be arranged by a logic comparison program into compatibility score arrangements. An "compatibility score arrangement" as used in this disclosure is any grouping of objects and/or databased on degree of match for future process output. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. Continuing the example, an output linguistic variable may represent, without limitation, signing a contract with a new client. An inference engine may combine rules, such as: "if the business activity is 'low' and the resource availability is 'high', the availability for new business is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
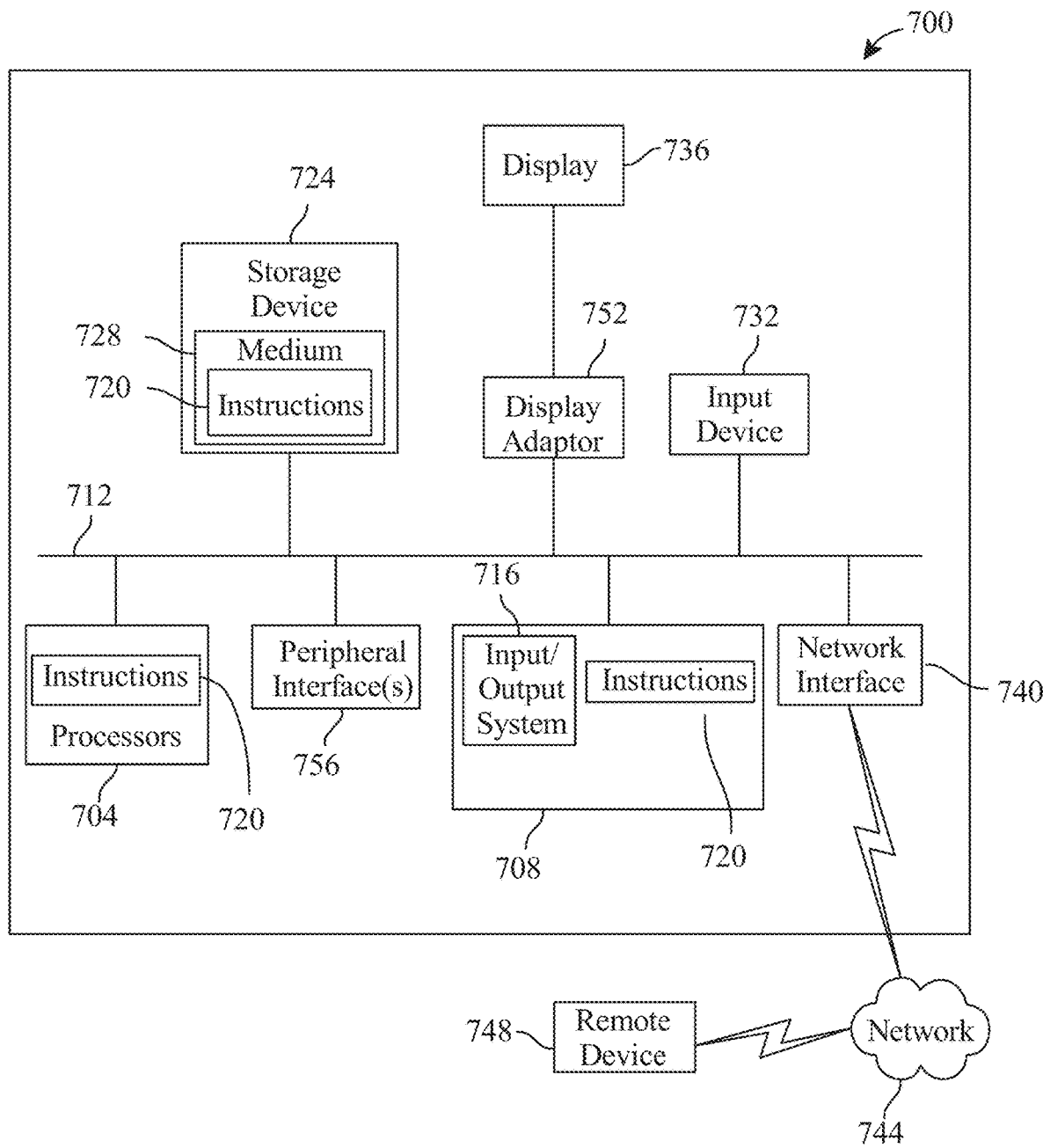
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for actualizing future process outputs using artificial intelligence, the apparatus comprising:
   at least a processor; and
   a memory communicatively coupled to the at least a processor, the memory containing instructions configuring the at least a processor to:
   receive input data comprising cluster data, wherein the cluster data comprises data associated with each user of a clustered group of users, wherein the clustered group comprises an organized body, wherein the cluster data comprises user role data comprising data associated with a current role of each user within the organized body;
   identify at least one future process output as a function of the input data, wherein identifying the at least one future process output as a function of the input data comprises:
   receiving user training data;
   training a future process output machine learning model as a function of the user training data; and
   generating a plurality of future process outputs using the trained future process output machine learning model;
   determine a highest priority future process output of the plurality of future process outputs using a linear program configured to optimize a linear objective function performed by the at least a processor, given at least a user constraint;
   classify the highest priority future process output into one or more objective groups as a function of an objective group classifier;

determine at least an actualization item as a function of the one or more objective groups and the highest priority future process output;
determine at least a process parameter as a function of the highest priority future process output; and
generate an objective output as a function of the at least a process parameter.

2. The apparatus of claim 1, wherein determining the highest priority future process output further comprises ranking the plurality of future process outputs.

3. The apparatus of claim 1, wherein determining the at least an actualization item as a function of the one or more objective groups and highest priority future process output comprises:
generating an actualization item machine learning model;
training the actualization item machine learning model as a function of actualization item training data; and
generating the at least an actualization item using the trained actualization item machine learning model.

4. The apparatus of claim 3, wherein determining the at least an actualization item as a function of the one or more objective groups and highest priority future process output comprises:
determining an actualization item score for each of the at least an actualization item;
comparing each actualization item score to a threshold actualization item score; and
identifying the at least an actualization item based on the comparison of each actualization item score to the threshold actualization item score.

5. The apparatus of claim 4, wherein determining the at least an actualization item as a function of the one or more objective groups and the highest priority future process output comprises generating a ranked list of the at least an actualization item as a function of the actualization item score.

6. The apparatus of claim 1, wherein determining the at least a process parameter as a function of the highest priority future process output comprises:
generating a process parameter machine learning model;
training the process parameter machine learning model as a function of process parameter training data; and
generating the at least a process parameter using the trained process parameter machine learning model.

7. The apparatus of claim 1, wherein the memory further comprises instructions configuring the at least a processor to determine a success expectation for the at least one user objective as a function of the user data, wherein determining the success expectation for the at least one user objective as a function of the user data comprises:
generating a success machine learning model;
training the success machine learning model as a function of success training data; and
generating the success expectation using the trained success machine learning model.

8. The apparatus of claim 1, wherein the memory further comprises instructions configuring the at least a processor to receive a user response from at least one user for the at least an actualization item, wherein the user response from the at least one user comprises a modification to the at least a process parameter.

9. A method for actualizing future process outputs using artificial intelligence, the method comprising:
receiving, by at least a processor, input data comprising cluster data, wherein the cluster data comprises data associated with each user of a clustered group of users, wherein the clustered group comprises an organized body, wherein the cluster data comprises user role data comprising data associated with a current role of each user within the organized body;
identifying, by the at least a processor, at least one future process output as a function of the input data, wherein identifying the at least one future process output as a function of the input data comprises:
receiving user training data;
training a future process output machine learning model as a function of the user training data; and
generating a plurality of future process outputs using the trained future process output machine learning model;
determining, by the at least a processor, a highest priority future process output of the plurality of future process outputs using a linear program configured to optimize a linear objective function performed by the at least a processor, given at least a user constraint;
classifying, by the at least a processor, the highest priority future process output into one or more objective groups as a function of an objective group classifier;
determining, by the at least a processor, at least an actualization item as a function of the one or more objective groups and the highest priority future process output;
determining, by the at least a processor, at least a process parameter as a function of the highest priority future process output; and
generating, by the at least a processor, an objective output as a function of the at least a process parameter.

10. The method of claim 9, wherein determining the highest priority future process output further comprises ranking the plurality of future process outputs.

11. The method of claim 9, wherein determining the at least an actualization item as a function of the one or more objective groups and the highest priority future process output comprises:
generating, by the at least a processor, an actualization item machine learning model;
training, by the at least a processor, the actualization item machine learning model as a function of actualization item training data; and
generating, by the at least a processor, the at least a actualization item using the trained actualization item machine learning model.

12. The method of claim 11, wherein determining the at least an actualization item as a function of the one or more objective groups and the highest priority future process output comprises:
determining, by the at least a processor, an actualization item score for each of the at least an actualization item;
comparing, by the at least a processor, each actualization item score to a threshold actualization item score; and
identifying, by the at least a processor, the at least an actualization item based on the comparison of each actualization item score to the threshold actualization item score.

13. The method of claim 12, wherein determining the at least an actualization item as a function of the one or more objective groups and the highest priority future process output further comprises generating a ranked list of the at least an actualization item as a function of the actualization item score.

14. The method of claim 9, wherein determining the at least a process parameter as a function of highest priority future process output comprises:

generating, by the at least a processor, a process parameter machine learning model;

training, by the at least a processor, the process parameter machine learning model as a function of process parameter training data; and generating, by the at least a processor, the at least a process parameter using the trained process parameter machine learning model.

15. The method of claim 9, further comprising determining, by the at least a processor, a success expectation for the at least one user objective as a function of the user data, wherein determining the success expectation for the at least one user objective as a function of the user data comprises:

generating, by the at least a processor, a success machine learning model;

training, by the at least a processor, the success machine learning model as a function of success training data; and generating, by the at least a processor, the success expectation using the trained success machine learning model.

16. The method of claim 9, further comprising receiving, by the at least a processor, a user response from at least one user for the at least an actualization item, wherein the user response from the at least one user comprises a modification to the at least a process parameter.

\* \* \* \* \*